Nov. 26, 1957 D. E. BLACKMER 2,814,715
PERCUSSIVE WELDING ARC STARTING DEVICES
Filed Oct. 25, 1955
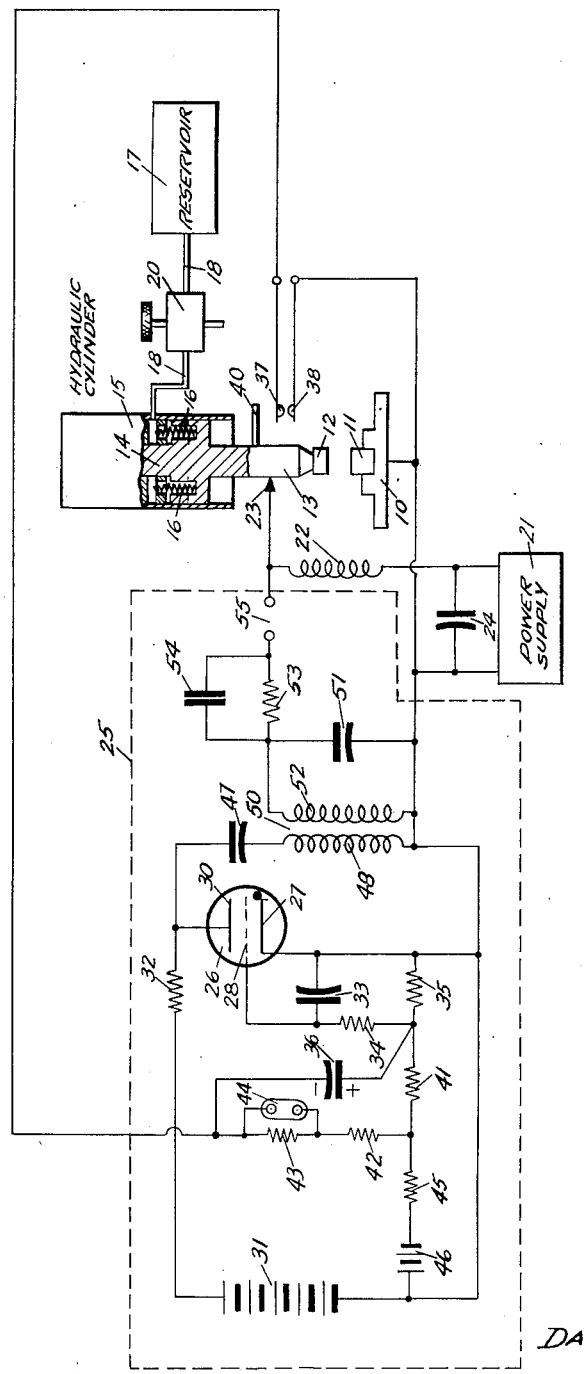
INVENTOR
DAVID E. BLACKMER
BY Elmer J. Gorn
ATTORNEY United States Patent Office 2,814,715
Patented Nov. 26, 1957

2,814,715

PERCUSSIVE WELDING ARC STARTING DEVICES

David E. Blackmer, Reading, Mass., assignor to Raytheon Manufacturing Company, Waltham, Mass., a corporation of Delaware Application October 25, 1955, Serial No. 542,537

10 Claims. (Cl. 219—95)

This invention relates to percussive welding apparatus, and, more particularly, to such apparatus in which the arc is started by ionizing the space between the movable and fixed workpieces with high frequency energy from a source comprising an arc activated by a switch operated when the movable workpiece approaches the fixed workpiece.

In percussive welding, difficulty is frequently experienced in starting the welding arc in a uniform manner for all shapes and kinds of workpieces and in all conditions of humidity, temperature, pressure, and surface conditions of the workpieces. Due to these varying conditions, the heat developed in the welded area will not be constant during the welding period over all the welded area nor from weld to weld. As a result, precautions must be taken to control the conditions of humidity, temperature, and pressure. The workpieces are machined or otherwise processed to present the optimum conditions for welding. All this adds to the expense of the welding processes if uniformly good quality is to be obtained.

In the copending application of Faulk et al., Serial No. 541,672, filed October 20, 1955, these difficulties have been avoided to some extent by applying a radio-frequency voltage across the workpieces while they are still separated by a distance greater than the normal breakdown gap. In accordance with the present invention, it has been found that this radio-frequency voltage can be obtained most conveniently and reliably by means of a circuit comprising an arc gap and a resonant circuit. The arc is initiated by the closing of a switching device when the movable workpiece arrives at a predetermined position. The presence of this high frequency voltage across the gap ionizes the air within the gap and starts the arc, permitting the welding current to flow at a time and in a density and distribution that is not affected by the humidity, temperature, pressure, and surface condition of the workpieces to give uniform reliable welds without expensive precautions.

Other and further advantages of this invention will be apparent as the description thereof progresses, reference being had to the accompanying drawing which is a schematic diagram of a representative circuit embodying the invention.

In the drawing, the reference numeral 10 designates the lower workpiece holder or electrode that may be of any of the well-known designs adapted to hold one of the two workpieces 11 in position for welding. Similarly, the other workpiece 12 is held by an upper workpiece holder 13. The upper workpiece holder is adapted to be driven down by a piston 14 mounted in a pneumatic or hydraulic cylinder 15 by means of springs 16. This cylinder is supplied with air or other fluid from a reservoir 17 through a pipeline 18 fitted with a valve 20, of any well-known design, which may be adapted to manual operation, as shown, or for operation by a solenoid. A source of D. C. potential 21 is connected to the upper workholder 13 through an inductance 22 and sliding contact 23, or by means of a flexible conductor or other convenient means. The other terminal of the power supply 21 is connected to the lower workholder 10. A capacitor 24 is shunted across the power supply 21 to store the energy for the weld. A source 25 of high frequency energy, described later, is coupled to the upper workholder through the sliding contact 23.

This radio-frequency source comprises a thyratron 26 having a cathode 27, a grid 28, and a plate 30. A source of positive potential 31 is connected between the plate 30 and the cathode 27 through a resistor 32. The grid 28 is coupled directly to the cathode 27 through a capacitor 33. It is also connected to the cathode through resistors 34 and 35. Resistor 35 is shunted by a capacitor 36 and a set of normally open contacts 37 and 38 is adapted to be closed by the descent of a finger 40 on the upper workholder 13. The capacitor 36 is shunted by resistors 41, 42, and 43. The resistor 43 is shunted by a diode 44, such as a neon light. The junction between resistors 41 and 42 is connected through a resistor 45 and a source 46 of negative potential to the cathode 27. The plate 30 is coupled to the cathode 27 through a capacitor 47 and the primary 48 of a transformer 50. A capacitor 51 is shunted across the secondary 52 of the transformer 50. One side of the secondary 52 is connected to the upper workholder 13 through a resistor 53 shunted by capacitor 54 and a spark gap 55.

In operation, before the valve 20 is opened, the upper workpiece holder 13 is held away from the lower workpiece holder 10 by the springs 16. The capacitor 24 is charged with the welding energy. The contacts 37 and 38 are open. This places a negative potential from the source 46 on the grid 28 of the thyratron 26 through resistors 34, 41, and 45, which prevents the thyratron from conducting, although a positive potential from the source 31 is applied to its plate 30. A current flows through the resistors 35, 41, and 45, and the source 46 of bias potential. This places a potential across capacitor 36 of the polarity indicated. No voltage drop appears across resistor 43 and diode 44 so that the diode 44 does not conduct. The result is to prevent the source of radio-frequency energy from being activated. When the valve 20 is opened, the upper workpiece 12 in the upper workpiece holder 13 moves down toward the lower workpiece 11 in the lower workpiece holder 10. At a point before breakdown of the welding voltage across the workpieces 11 and 12 would normally take place to create an arc between the workpieces, the contacts 37 and 38 meet. This closes a path from the negative source 46 through resistors 45, 42, and 43. This reduces the negative potential on the grid 28 and, in fact, a momentary positive potential appears there due to the charge on the capacitor 36 before it discharges. The speed of this discharge is increased by the voltage drop across the resistor 43, causing the diode 44 to fire providing a low resistance path for the discharge until the voltage drop decreases below that necessary to maintain the discharge. The result is to cause the thyratron 26 to conduct and connect the capacitor 47 across the primary 48 for a half cycle of the resonant period of the resonant circuit formed by the capacitor 47 and the primary 48. A voltage rises rapidly across the secondary 52 of the transformer 50 charging capacitor 51 to a high voltage, such as 30 or 40 kilovolts, in a very short time, in the order of a millisecond. This high voltage is sufficient to ionize and break down the gap 55 and connect the capacitor 51 and the inductance 22 is parallel through the relatively low resistance of the ionized gap 55. The breakdown of the gap 55 is somewhat delayed by the time delay provided by the capacitor 54 and resistor 53. The inductance 22 and the capacitor 51 then act as a resonant circuit having an exponentially decreasing alternating voltage which starts at 30 or 40 kilovolts. This voltage ionizes the gap between the upper workpiece 12 and the lower workpiece 11. If the workholder 13 is at a sufficiently high D. C. potential relative to the workholder 10, the spark caused by this high frequency ionization starts an arc. When this arc starts, capacitor 24 and inductance 22 resonate at their natural period, the circulating current in this series circuit being the welding current. In a representative case the welding current was 2,000 amperes at 900 cycles per second. The inductance 22 acts both as the arc-starting tuning inductor and as the welding current control inductance.

The apparatus has been shown with the movable workholder being held above the fixed workholder. The reverse arrangement could be used. The workpieces could be arranged with their axes at any angle to the vertical. Both holders could be arranged to move together, all without deviating substantially from the principle of the invention. The equipment of the invention supplies a precise value of welding current in accurate, timed welding sequence.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. In welding apparatus of the type having a fixed and movable workpiece holder with means to apply a welding current through the workpieces when the pieces are in contact, a high frequency oscillator connected across the workpieces comprising a source of direct current shunted by a resistor, a capacitor and the primary of a transformer, the secondary of said transformer being shunted by a second capacitor of less capacity than the first and coupled to the movable workpiece by an arc discharge path, and a switching device for initiating an arc across said path and activating said oscillator under control of the movable workpiece holder.

2. In welding apparatus of the type having a fixed and movable workpiece holder with means to apply a welding current through the workpieces when the pieces are in contact, a high frequency oscillator connected across the workpieces comprising an arc discharge path, and a switching device for initiating an arc across said path and activating said oscillator comprising a grid controlled gaseous discharge device connected across said first mentioned capacitor and the primary of the transformer, and triggering means connected to the grid of said device under control of the movable workpiece holder.

3. In welding apparatus of the type having a fixed and movable workpiece holder with means to apply a welding current through the workpieces when the pieces are in contact, a high frequency oscillator connected across the workpieces comprising an arc discharge path, and a switching device for initiating an arc across said path and activating said oscillator comprising a grid controlled gaseous discharge device connected across said first mentioned capacitor and the primary of the transformer, and triggering means connected to the grid of said device under control of the movable workpiece holder, said triggering means comprising a source of negative potential connected to the grid of said device through at least two resistors, a capacitor connected between the grid and cathode of said device, a resistor connecting the junction of the two resistors to the cathode of said device, and a capacitor in series with a set of normally open contacts under control of the movable workpiece holder.

4. In welding apparatus of the type having a fixed and movable workpiece holder with means to apply a welding current through the workpieces when the pieces are in contact, comprising a source of direct current shunted by a large capacity and connected to the movable workpiece holder through an inductance, a high frequency oscillator connected across the workpieces comprising a source of direct current shunted by a resistor, a capacitor and the primary of a transformer, the secondary of said transformer being shunted by a second capacitor of less capacity than the first and coupled to the movable workpiece by an arc discharge path, and a switching device for initiating an arc across said path and activating said oscillator under control of the movable workpiece holder.

5. In welding apparatus of the type having a fixed and movable workpiece holder with means to apply a welding current through the workpieces comprising a source of direct current shunted by a large capacitor and connected to the movable workpiece holder through an inductance, a high frequency oscillator connected across the workpieces comprising an arc discharge path, and a switching device for initiating an arc across said path and activating said oscillator comprising a grid controlled gaseous discharge device connected across said first mentioned capacitor and the primary of the transformer, and triggering means under control of the movable workpiece holder, said triggering means comprising a source of negative potential connected to the grid of said device through at least two resistors, a capacitor connected between the grid and cathode of said device, a resistor connecting the junction of the two resistors to the cathode of said device, and a capacitor in series with a set of normally open contacts under control of the movable workpiece holder.

6. In welding apparatus of the type having a fixed and movable workpiece holder with means to apply a welding circuit through the workpieces comprising a source of direct current shunted by a large capacitor and connected to the movable workpiece holder through an inductance when the pieces are in contact, a high frequency oscillator connected across the workpieces comprising an arc discharge path, and a switching device for initiating an arc across said path and activating said oscillator comprising a grid controlled gaseous discharge device connected across said first mentioned capacitor and the primary of the transformer, and triggering means connected to the grid of said device under control of the movable workpiece holder, said triggering means comprising a source of negative potential connected to the grid of said device through at least two resistors, a capacitor connected between the grid and cathode of said device, a resistor connecting the junction of the two resistors to the cathode of said device, and a capacitor in series with a set of normally open contacts under control of the movable workpiece holder.

7. In welding apparatus of the type having a fixed and movable workpiece holder with means to apply a welding current through the workpieces when the pieces are in contact, a high frequency oscillator connected across the workpieces comprising a source of direct current shunted by a resistor, a capacitor and the primary of a transformer, the secondary of said transformer being shunted by a second capacitor of less capacity than the first and coupled to the movable workpiece by an arc discharge path, and a switching device for initiating an arc across said path and activating said oscillator comprising a grid controlled gaseous discharge device connected across said first mentioned capacitor and the primary of the transformer, and triggering means connected to the grid of said device under control of the movable workpiece holder.

8. In welding apparatus of the type having a fixed and movable workpiece holder with means to apply a welding current through the workpieces when the pieces are in contact, a high frequency oscillator connected across the workpieces comprising an arc discharge path, a source of direct current shunted by a resistor, a capacitor, and the primary of a transformer, the secondary of said transformer being shunted by a second capacitor of less capacity than the first and coupled to the movable workpiece by an arc discharge path, and a switching device for initiating an arc across said path and activating said oscillator comprising a grid controlled gaseous discharge device connected across said first mentioned capacitor and the primary of the transformer, and triggering means connected to the grid of said device under control of the movable workpiece holder, said triggering means comprising a source of negative potential connected to the grid of said device through at least two resistors, a capacitor connected between the grid and cathode of said device, a resistor connecting the junction of the two resistors to the cathode of said device, and a capacitor in series with a set of normally open contacts under control of the movable workpiece holder.

9. In welding apparatus of the type having a fixed and movable workpiece holder with means to apply a welding current through the workpieces when the pieces are in contact, compriisng a source of direct current shunted by a large capacitor and connected to the movable workpiece holder through an inductance, a high frequency oscillator connected across the workpieces comprising a source of direct current shunted by a resistor, a capacitor and the primary of a transformer, the secondary of said transformer being shunted by a second capacitor of less capacity than the first and coupled to the movable workpiece by an arc discharge path, and a switching device for initiating an arc across said path and activating said oscillator comprising a grid controlled gaseous discharge device connected across said first mentioned capacitor and the primary of the transformer, and triggering means connected to the grid of said device under control of the movable workpiece holder.

10. In welding apparatus of the type having a fixed and movable workpiece holder with means to apply a welding current through the workpieces comprising a source of direct current shunted by a large capacitor and connected to the movable workpiece holder through an inductance when the pieces are in contact, a high frequency oscillator connected across the workpieces comprising a source of direct current shunted by a resistor, a capacitor, and the primary of a transformer, the secondary of said transformer being shunted by a second capacitor of less capacity than the first and coupled to the movable workpiece by an arc discharge path, and a switching device for initiating an arc across said path and activating said oscillator comprising a grid controlled gaseous discharge device connected across said first mentioned capacitor and the primary of the transformer, and triggering means connected to the grid of said device under control of the movable workpiece holder, said triggering means comprising a source of negative potential connected to the grid of said device through at least two resistors, a capacitor connected between the grid and cathode of said device, a resistor connecting the junction of the two resistors to the cathode of said device, and a capacitor in series with a set of normally open contacts under control of the movable workpiece holder.

References Cited in the file of this patent

UNITED STATES PATENTS

| | | |
|---|---|---|
| 837,277 | Birkeland et al. | Dec. 4, 1906 |
| 1,373,054 | Chubb | Mar. 29, 1921 |
| 2,659,036 | Needham et al. | Nov. 10, 1953 |